US008606578B2

(12) United States Patent
Deisher et al.

(10) Patent No.: US 8,606,578 B2
(45) Date of Patent: Dec. 10, 2013

(54) METHOD AND APPARATUS FOR IMPROVING MEMORY LOCALITY FOR REAL-TIME SPEECH RECOGNITION

(75) Inventors: Michael Eugene Deisher, North Plains, OR (US); Tao Ma, Starkville, MS (US)

(73) Assignee: Intel Corporation, Santa Clara, CA (US)

( * ) Notice: Subject to any disclaimer, the term of this patent is extended or adjusted under 35 U.S.C. 154(b) by 1203 days.

(21) Appl. No.: 12/491,933

(22) Filed: Jun. 25, 2009

(65) Prior Publication Data

US 2010/0332228 A1  Dec. 30, 2010

(51) Int. Cl.
 *G10L 15/06* (2013.01)
 *G10L 15/00* (2013.01)

(52) U.S. Cl.
 USPC ........................... 704/243; 704/236; 704/242

(58) Field of Classification Search
 USPC .......................... 704/236, 242, 243, 251, 255
 See application file for complete search history.

(56) References Cited

U.S. PATENT DOCUMENTS

| | | | | |
|---|---|---|---|---|
| 5,455,889 A * | 10/1995 | Bahl et al. | ...................... | 704/236 |
| 5,664,061 A * | 9/1997 | Andreshak et al. | ........... | 704/275 |
| 5,884,259 A * | 3/1999 | Bahl et al. | ...................... | 704/252 |
| 5,937,384 A * | 8/1999 | Huang et al. | .................. | 704/256 |
| 2005/0075876 A1* | 4/2005 | Tsuruta | ......................... | 704/251 |
| 2008/0300875 A1* | 12/2008 | Yao et al. | ...................... | 704/236 |

OTHER PUBLICATIONS

Young-kyu Choi et al., "EPGA-Based Implementation of a Real-Time 5000-Word Continuous Speech Recognizer", School of Electrical Engineering, Seoul National University, Aug. 2008, 5pgs.
Mathew, Binu et al., "A Low-Power Accelerator for the SPINX 3 Speech Recognition System", School of Computing, University of Utah, Cases'03, Oct. 30-Nov. 2, 2003, San Jose, California, USA, Copyright 2003 ACM 1-58113-676-5/03/0010, 10pgs.

* cited by examiner

*Primary Examiner* — Angela A Armstrong
(74) *Attorney, Agent, or Firm* — Buckley, Maschoff & Talwalkar LLC

(57) ABSTRACT

According to some embodiments, a method and apparatus are provided to buffer N audio frames of a plurality of audio frames associated with an audio signal, pre-compute scores for a subset of context dependent models (CDMs), and perform a graphical model search associated with the N audio frames where a score of a context independent model (CIM) associated with a CDM is used in lieu of a score for the CDM when a score for the CDM is needed and has not been pre-computed.

14 Claims, 6 Drawing Sheets

CD GMM Activity Table

| CD GMM | Active |
|---|---|
| 0 | 0 |
| 1 | 1 |
| 2 | 1 |
| 3 | 0 |
| 4 | 1 |
| 5 | 1 |
| : | : |
| 7998 | 0 |
| 7999 | 1 |

FIG. 2

Frame

|  | 0 | 1 | 2 | 3 |
|---|---|---|---|---|
| 0 | 55 | | | |
| 1 | 65 | 40 | 22 | 80 |
| 2 | 14 | | | |
| 3 | 77 | | | |
| 4 | 13 | | | |
| 5 | 75 | 25 | 40 | 90 |

CD GMM (row axis label)

FIG. 3

CD GMM Score Cache
Frame Number

| 0 | 1 | 2 | 3 |
|---|---|---|---|
| 65 | 75 | | |
| 40 | 25 | | |
| 22 | 40 | | |
| 80 | 90 | | |

Score (row axis label)

FIG. 4

CD GMM Mapping
Table

CD GMM

| 1 |
| 5 |
| : |
| 4 |
| 2 |
| 0 |

FIG. 5

Current Frame
Score Buffer

601

| GMM | Score |
|---|---|
| 0 | 98 |
| 1 | 65 |
| 2 | 56 |
| 3 | 71 |
| 4 | 15 |
| 5 | 75 |

Current Frame
Score Buffer

602

| GMM | Score |
|---|---|
| 0 | 44 |
| 1 | 40 |
| 2 | 36 |
| 3 | 39 |
| 4 | 37 |
| 5 | 25 |

FIG. 6

CI Score Cache

Frame

| CI GMM | 0 | 1 | 2 | 3 |
|---|---|---|---|---|
| 0 | 72 | 5 | 36 | 43 |
| 1 | 56 | 36 | 54 | 49 |
| 2 | 15 | 37 | 32 | 76 |
| . | . | . | . | . |
| . | . | . | . | . |
| 57 | 98 | 44 | 42 | 55 |
| 58 | 71 | 39 | 40 | 90 |

FIG. 7

CD to CI Mapping Table

|  | CI index |
|---|---|
| 0 | 57 |
| 1 | 43 |
| 2 | 1 |
| 3 | 58 |
| 4 | 2 |
| . | . |
| . | . |
| Number of CD GMMs -1 | 3 |

METHOD AND APPARATUS FOR IMPROVING MEMORY LOCALITY FOR REAL-TIME SPEECH RECOGNITION

BACKGROUND

Most large vocabulary continuous speech recognition systems use continuous density hidden Markov models (HMM) for the acoustic modeling of speech. An HMM may comprise several active states and each active state output may be modeled with a Gaussian Mixture Model (GMM) probability density function. HMMs are typically used to model subword units of sound or entire words. In the English language, there are approximately forty phonemes or individual units of sound that can be employed to form more complex utterances. Phonemes may be considered in context, and there are up to 64,000 triphones (i.e., sequences of three phonemes) in the English language.

A model of a phoneme in isolation may be referred to as a context independent (CI) phoneme model. A model of a sequence of phonemes may be referred to as a context dependent (CD) phoneme model. For example, in the word "cat" the /c/ sound may be modeled with a CI phoneme model and the /c/a/ sound may be modeled with a CD phoneme model. GMMs may be used to represent the state output probability density functions of CI phoneme models (i.e., a CI GMM) and CD phoneme models (i.e., CD GMM).

In conventional speech recognition systems, scores for GMMs associated with phonemes and triphones are computed for each frame of an audio signal and stored. This requires significant processing and memory usage. For real-time processing, all GMM parameters (e.g., means, variances, mixture weights) must be continually loaded resulting in a high memory bandwidth requirement. In a portable device, high computation usage and memory bandwidth may lead to a slow response time for an end user as well as a shortened battery life.

BRIEF DESCRIPTION OF THE DRAWINGS

FIG. 2 illustrates a state table according to some embodiments.

FIG. 3 illustrates scores associated with frames according to some embodiments.

FIG. 4 illustrates a score cache according to some embodiments.

FIG. 5 illustrates a mapping table according to some embodiments.

FIG. 6 illustrates a current frame score buffer according to some embodiments.

FIG. 7 illustrates a score cache according to some embodiments.

FIG. 8 illustrates a mapping table according to some embodiments.

DETAILED DESCRIPTION

The several embodiments described herein are solely for the purpose of illustration. Embodiments may include any currently or hereafter-known versions of the elements described herein. Therefore, persons in the art will recognize from this description that other embodiments may be practiced with various modifications and alterations.

Figure 1:
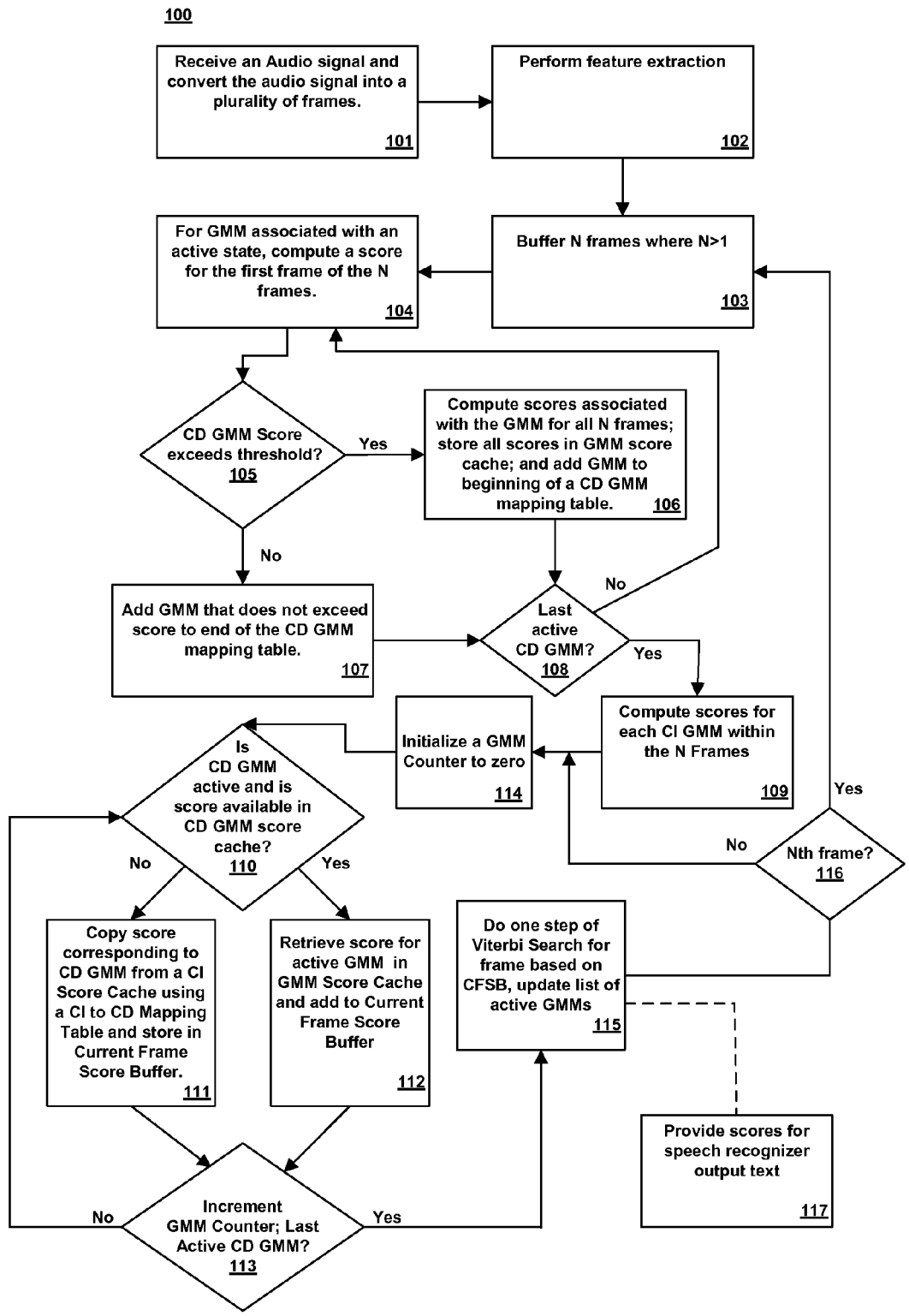
FIG. 1 illustrates a process according to some embodiments.

Referring now to FIG. 1 an embodiment of a process 100 is shown. The process 100 may be executed by an apparatus, such as, but not limited to, apparatus 900 of FIG. 9. The process 100 may be embodied in computer-executable program code stored on a tangible medium. At 101 of process 100, an audio signal may be received and the audio signal may be converted into a plurality of frames. In some embodiments, the audio signal may be received at a microphone such as microphone 902 of FIG. 9 and the signal may be converted into a plurality of frames by a processor such as processor 903.

At 102, feature extraction is performed on the plurality of frames. In some embodiments, feature extraction may comprise transforming the plurality of frames into a reduced representation set of features such as feature vectors. In some embodiments, each feature vector may represent a set amount of time associated with the audio signal. For example, each feature vector may represent 10 milliseconds of the audio signal. In some embodiments feature extraction may be performed after N number of frames are buffered at 103.

Next, at 103, N number of frames of the plurality of frames are buffered. N may represent any integer that is greater than 1. The N frames may be buffered into memory such as memory 904.

At 104, a score for each GMM that is associated with an active state may be computed for a first frame of the N frames. In some embodiments, an active state may comprise an active HMM state. In some embodiments, GMMs that are associated with active states may be listed in a GMM activity table. For example, and referring to FIG. 2, an embodiment of a GMM activity table is illustrated. The GMM activity table may comprise a list of CD GMMs and an indication if an associated CD GMM is active. For example, a CD GMM denoted with a 1 may indicate that a particular CD GMM is active, and a CD GMM denoted with a 0 may indicate that a particular CD GMM is inactive. However, indications are not limited to a 1 or a 0 and may comprise other indicating schemes.

As illustrated in FIG. 2, the state table comprises 8000 rows. In some embodiments, a number of CD GMMs associated with the English Language may be approximately 8000. However, the state table may comprise any number of rows to represent any number of CD GMMs.

For illustrative purposes, and to aid in understanding features of the present disclosure, an example will now be introduced. This example will be carried through the detailed description and this example is not intended to limit the scope of the appended claims.

As illustrated in the state table of FIG. 2, CD GMMs 1, 2, and 7999 are active and CD GMMs 0, 3, and 7998 are inactive.

Referring back to FIG. 1, at 105, a determination is made if a score associated with a CD GMM exceeds a threshold score. In some embodiments, the threshold score may comprise a score based on historical values and/or results. In some embodiments, the threshold may be adjusted by a user.

If, at 105, the score of a CD GMM exceeds the threshold score, then, at 106, a score associated with the GMM may be computed for all N frames (i.e., the remaining N-1 frames). The scores for the N-1 subsequent frames may be stored consecutively in a CD GMM score cache such as the score cache illustrated in FIG. 4. In some embodiments, storing scores consecutively in memory may reduce memory usage. Furthermore, an indication of the scores may be stored in a mapping table such as the mapping table illustrated in FIG. 5 that maps indices of CD GMMs to row numbers of the GMM score cache. In some embodiments, the indication of scores may be stored starting at a first end of the mapping table.

However, if a CD GMM score at 105 does not exceed the threshold score, then at 107, a reference to the CD GMM is added to the mapping table. In some embodiments, the reference to the CD GMM that fails to meet the threshold score may be stored starting at a second end of the mapping table.

In some embodiments, the mapping table may be a fixed length array with a counter M that determines a maximum position of active CD GMM (or associated CI GMM) entries. Entries into the mapping table between M and the end of the table may comprise indications of CD GMMs that were either inactive or failed to meet the threshold at a time of population of the mapping table. Therefore, the mapping table may define a first area for CD GMMs that are active and whose scores have exceeded a threshold and a second area for CD GMMs whose scores have not exceeded the threshold.

FIG. 3 will be used to describe an example of flow cycling through 104-108 according to some embodiments. If a threshold value is determined to be 60 then only active CD GMMs that are associated with frame 0 which have scores exceeding 60 will have exceeded the threshold. Looking at CD GMM 0, this CD GMM is not active according to the state table of FIG. 2 so it won't be evaluated. However, in some embodiments, it will be added to the second area of the mapping table.

Next, CD GMM 1 is considered active and a score is computed at 104, with a result of 65 for frame 0. Therefore, at 105, CD GMM 1 is determined to exceed the threshold score of 60.

Since the threshold score of 60 was exceeded for CD GMM 1, at 106 the scores for frames 1, 2, and 3 are computed for CD GMMs 1 and these scores are stored contiguously in a CD GMM Score cache (CD-CACHE) as illustrated in FIG. 4. Furthermore, and now referring to FIG. 5, the first entry into the mapping table comprises a 1 which refers to CD GMM 1 whose scores were stored in position 0 (i.e., the first position) of the CD-CACHE. Process 100 advances to 108 where it is determined if a last active CD GMM has been evaluated.

Since not all active CD GMMs have been evaluated, CD GMM 2 is evaluated since this CD GMM is active. At 104, a score is computed for CD GMM 2 with a result of 14. At 105, it is determined that the score for CD GMM 2 does not exceed the threshold score of 60. Therefore, process 100 advances to 107 and an indication of CD GMM 2 may be stored in the mapping table starting at a second end of the mapping table. For example, a last position of the mapping table illustrated in FIG. 5 comprises a 0 which refers to CD GMM 0. Similar to CD GMM 1, scores for CD GMM 5 are stored in location 1 of the CD-CACHE. The second entry into the mapping table comprises a 5 which refers to CD GMM 5 whose scores were stored in position 1 (i.e., the second position) of the mapping table. Similar to CD GMM 0, a next to last position of the mapping table comprise a 4, which refers to CD GMM 4 which is active but whose score does not exceed the threshold score. Entries may be added to the mapping table even for inactive or active models with scores below the threshold.

Referring back to FIG. 1, at 108 a determination is made if there are additional CD GMMs. If no more CD GMMs remain, scores for each of the N frames are computed for each CI GMM at 109. Scores associated with each CI GMM are stored in a CI GMM score cache (CI-CACHE) such as that illustrated in FIG. 7. At 114, a GMM counter may be to zero.

Next, at 110, a determination is made if an active CD GMM score is indicated in the CD-CACHE. Or, in other words, a determination is made as to whether a score associated with an audio frame and with a CD GMM (i.e. a context dependent model) has been pre-computed.

In some embodiments, 110 includes indentifying a first active CD GMM from the mapping table and then determining whether this CD GMM is represented in first area of the mapping table. If an indication of the first active CD GMM is contained in the mapping table in the first area then, at 112, a score associated with the CD GMM for a particular frame is retrieved from the CD-CACHE and is stored in a current frame score buffer (CFSB). CI GMM scores associated with CD GMMs that are inactive may be copied into the CFSB such as CD GMMs 0 and 3 of FIG. 3. Since an indication for a score for CD GMM 3 is not found in the mapping table (because CD GMM 3 is not active), a score associated with CD GMM 3 is replaced by an associated CI GMM score. For example, as illustrated in FIG. 8, a score for CI GMM 57 associated with frame 0 (i.e., 98) will be used in lieu of a score for CD GMM 0 and a score for CI GMM 58 associated with frame 0 (i.e., 71) will be used in lieu of a score for CD GMM 3.

However, if an active CD GMM is not found in the CD-CACHE, or equivalently is not found in the first part of the mapping table, then, at 111, a CI GMM score associated with the CD GMM for the particular frame is retrieved from the CI-CACHE. The CI GMM score is stored in the CFSB in lieu of the CD GMM score. Or in other words, if an indication of a pre-computed score for a CD GMM is not found in the mapping table, then the score for the CD GMM is not entered into the CFSB and a corresponding pre-computed CI GMM (i.e., a context independent model) score is entered into the CFSB. According to some embodiments, using a pre-computed CI GMM score in lieu of a non-computed CD GMM score reduces memory bandwidth and processor usage. In some embodiments, at 113 the GMM counter may be incremented to facilitate stepping through a plurality of CD GMMs.

Continuing with the above example, FIG. 6 will be used to describe an example of flow cycling through 110-113. Looking at CD GMM 1 for frame 0, the score (i.e., 65) for CD GMM 1 may be entered into position 1 of the CFSB 601 at 112. Next, a score for CD GMM 2 at frame 0 did not pass the threshold score and thus a score corresponding to CD GMM 2 is retrieved from the CI-CACHE (i.e., 56) for frame 0 and stored in the CFSB 601. The score is retrieved from the CI-CACHE by the use of a CI to CD mapping table. As illustrated in FIG. 8, the CI to CD mapping table indicates which CI is mapped to a particular CD. In some embodiments, the CI to CD mapping table is fixed.

Referring back to FIG. 1, at 113 if no frame 0 active CD GMMS remain to be processed for the current frame, process 100 advances to 115.

At 115, one step of a Viterbi search is performed based on the scores for the current frame stored in the CFSB. The Viterbi search may use the values in the CFSB to compute an optimal (i.e., most likely) state sequence. The Viterbi search may update entries in the GMM activity table, such as the state table of FIG. 2, to indicate that a particular CD GMM has become active or that a particular CD GMM has become inactive based on the Viterbi search. In some embodiments, a Viterbi search may be a graphical model search that is associated with a graphical model. The graphical model may comprise one or more hidden Markov models.

After a Viterbi search is performed for a first frame using the CFSB 601, a second CFSB 602 associated with frame 1 is populated. Similar to CFSB 601, CFSB 602 comprises scores for CD GMMs 1, 2, and 5 (i.e., 40, 55, and 25 respectively) and corresponding CI GMM scores for CD GMMs 0, 3, and 4 (i.e., 44, 39, and 37 respectively). However, in some embodiments, if the Viterbi search were to determine that CD GMM 3 was active, the state table of FIG. 2 would be updated to indicate that CD GMM 3 was active but a score for CD GMM 3 would not be computed until a second set of N frames were buffered.

Next, 116 includes a determination as to whether the Nth frame has been processed. If the Nth frame has been processed, the process 100 returns to 103 and a second set of N frames are buffered. After one or more loops of process 100, the Viterbi search may output, at 117 a lattice of scores used to determine speech recognition output text.

Figure 9:
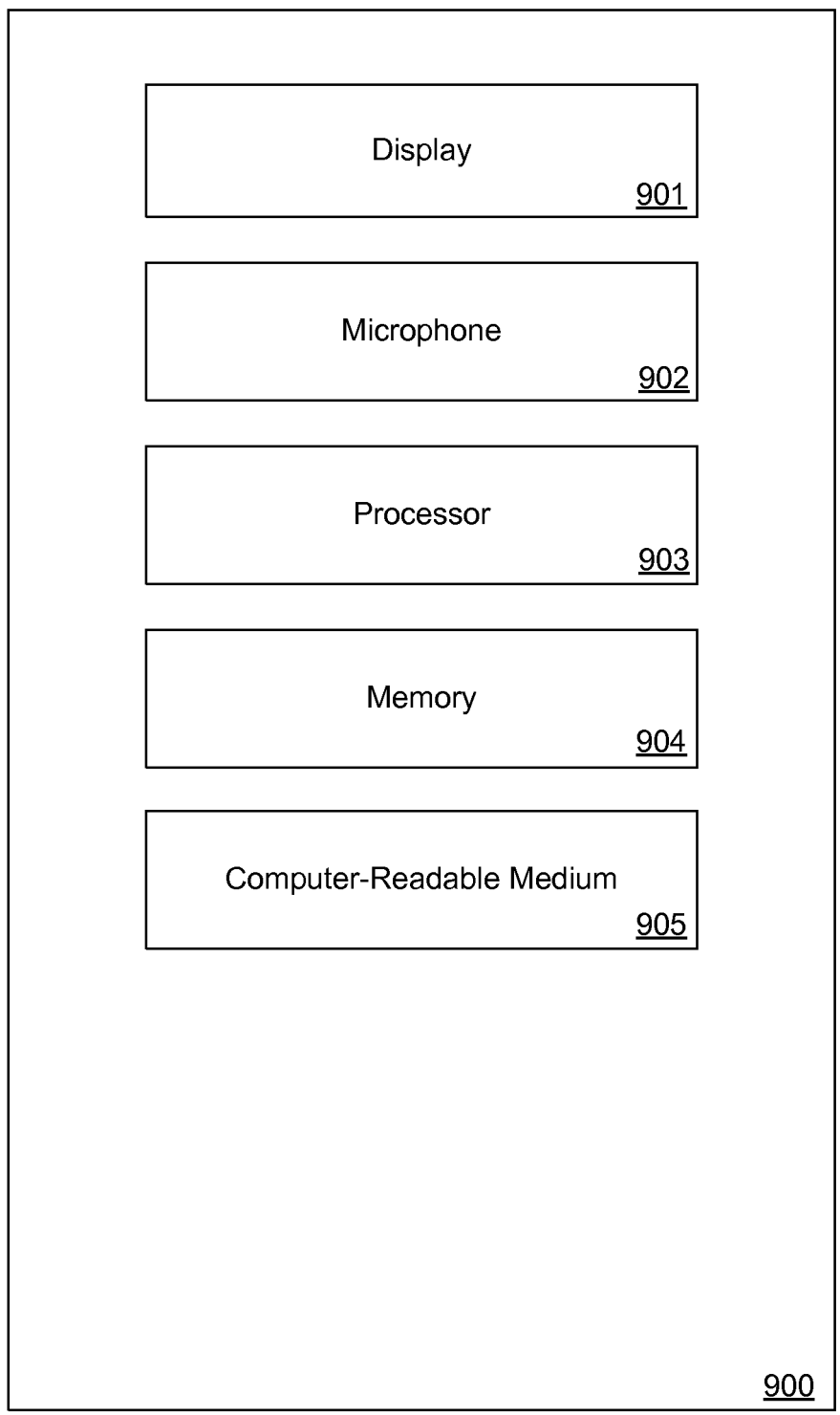
FIG. 9 illustrates an apparatus according to some embodiments.

Now referring to FIG. 9, an embodiment of an apparatus 900 is illustrated. In some embodiments, the apparatus 900 may comprise a device, such as, but not limited to, a cell phone, a personal data assistant, or a laptop computer. Furthermore, in some embodiments the apparatus 900 may act as an off-loader. The apparatus 900 may comprise more or fewer elements than currently illustrated in FIG. 9. However, as illustrated, the apparatus 900 comprises a display 901, a microphone, 902, a processor 903, memory 904, a computer-readable medium 905.

The memory 904 may store, for example, applications, programs procedures, and/or modules that store instructions to be executed. The memory 904 may comprise, according to some embodiments, any type of memory for storing data, such as, but not limited to, a Single Data Rate Random Access Memory (SDR-RAM), a Double Data Rate Random Access Memory (DDR-RAM), a Programmable Read Only Memory (PROM), or flash memory.

The display 901 may comprise any display capable of displaying graphics and/or text such as, but not limited to, a cathode ray tube, a liquid crystal display, or a plasma display.

The microphone 902 may comprise any device that can receive an audio signal and convert the audio signal into an electrical signal. In some embodiments, the microphone may be a transducer or sensor that utilizes a thin membrane to vibrate in response to sound pressure.

The processor 903 may comprise any processor that can execute program code. For example, the processor may execute program code stored in the computer-readable medium 905.

The computer-readable medium 905 may comprise any medium that is, or will be known, to store instructions that can be executed by a processor. For example, the computer-readable medium may comprise, but is not limited to, memory such as memory 904 or an optical storage such as a compact disk or digital video disk.

Various modifications and changes may be made to the foregoing embodiments without departing from the broader spirit and scope set forth in the appended claims.

What is claimed is:

1. A method comprising:
    buffering N audio frames of a plurality of audio frames associated with an audio signal, where N is greater than 1;
    pre-computing scores, by using a processor, for a subset of context dependent models (CDMs);
    performing a graphical model search associated with the N audio frames;
    determining that a score of a context independent model (CIM) associated with a CDM and an audio frame is to be used in lieu of a score for the CDM when a score for the CDM is required by the graphical model search and the score for the CDM has not been pre-computed;
    pre-computing all scores of CIMs associated with the N frames; and
    storing the pre-computed scores associated with the CIMs in a context independent score cache (CI-CACHE), wherein determining the CIM score associated with the CDM comprises retrieving a score from the CI-CACHE based on a CIM to CDM mapping table.

2. The method of claim 1, wherein the graphical model search is a Viterbi search.

3. The method of claim 1, wherein a graphical model, associated with the graphical model search, comprises one or more hidden Markov models.

4. The method of claim 1, further comprising:
    storing the pre-computed scores in a current frame score buffer (CFSB);
    storing data indicating a first plurality of active CDMs; and
    updating the data to indicate a second plurality of active CDMs based on a Viterbi search.

5. The method of claim 1, wherein the subset of CDMs is reduced by excluding N-1 frames when a first frame score for a CDM is below a threshold score.

6. The method of claim 1, wherein buffering of N frames worth of audio comprises performing feature extraction and storing feature vectors corresponding to the N frames worth of audio.

7. The method of claim 1, wherein the pre-computed scores are stored contiguously in a CD-CACHE.

8. An apparatus comprising:
    a microphone to receive speech;
    a processor; and
    a computer-readable medium storing instructions that when executed by the processor:
        buffer N audio frames of a plurality of audio frames associated with an audio signal, where N is greater than 1;
        pre-compute scores for a subset of context dependent models (CDMs);
        perform a graphical model search associated with the N audio frames;
        determine that a score of a context independent model (CIM) associated with a CDM and an audio frame is to be used in lieu of a score for the CDM when a score for the CDM is required by the graphical model search and the score for the CDM has not been pre-computed;
        pre-compute all scores of CIMs associated with the N frames; and
        store the pre-computed scores associated with the CIMs in a context independent score cache (CI-CACHE) wherein determining the CIM score associated with the CDM comprises retrieving a score from the CI-CACHE based on a CIM to CDM mapping table.

9. The apparatus of claim 8, wherein the graphical model search is a Viterbi search.

10. The apparatus of claim 8, wherein performing the graphical model search comprises searching for one or more hidden Markov models.

11. The apparatus of claim 8, further comprising instruction to:
    store the pre-computed scores in a current frame score buffer (CFSB);
    store data indicating a first plurality of active CDMs; and
    update the data to indicate a second plurality of active CDMs based on a Viterbi search.

12. The apparatus of claim 8, wherein the subset of CDMs is reduced by excluding N-1 frames when a first frame score for a CDM is below a threshold score.

13. The apparatus of claim 8, wherein buffering of N frames worth of audio comprises performing feature extraction.

14. The apparatus of claim 8, wherein the pre-computed scores are stored contiguously in a CD-CACHE.

* * * * *